US008490149B1

United States Patent
Ravi et al.

(10) Patent No.: US 8,490,149 B1
(45) Date of Patent: Jul. 16, 2013

(54) SECURE SESSION HANDLING IN A DEVICE AFTER A POLICY UPDATE

(75) Inventors: Sunil Ravi, Milpitas, CA (US); Krishna Narayanaswamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 558 days.

(21) Appl. No.: 12/194,704

(22) Filed: Aug. 20, 2008

(51) Int. Cl.
*H04L 9/00* (2006.01)

(52) U.S. Cl.
USPC .................................. 726/1; 726/13

(58) Field of Classification Search
USPC ....................................... 726/1, 13
See application file for complete search history.

(56) References Cited

U.S. PATENT DOCUMENTS

| | | | |
|---|---|---|---|
| 7,257,833 B1 * | 8/2007 | Parekh et al. ...................... 726/1 |
| 7,260,558 B1 * | 8/2007 | Cheng et al. .................... 706/12 |
| 7,353,332 B2 * | 4/2008 | Miller et al. ................... 711/108 |
| 7,415,719 B2 * | 8/2008 | Moghe et al. ...................... 726/1 |
| 7,440,304 B1 * | 10/2008 | Raj .............................. 365/49.1 |
| 7,486,673 B2 * | 2/2009 | Harijono et al. .............. 370/389 |
| 7,606,147 B2 * | 10/2009 | Luft et al. ...................... 370/229 |
| 7,805,752 B2 * | 9/2010 | Newstadt et al. .................. 726/1 |
| 7,853,987 B2 * | 12/2010 | Balasubramanian et al. .... 726/2 |
| 7,861,304 B1 * | 12/2010 | Nachenberg et al. ........... 726/24 |
| 2002/0124086 A1 * | 9/2002 | Mar .............................. 709/226 |
| 2002/0165949 A1 * | 11/2002 | Na et al. ........................ 709/223 |
| 2007/0281699 A1 * | 12/2007 | Rasanen ....................... 455/436 |

* cited by examiner

*Primary Examiner* — Jung Kim
*Assistant Examiner* — Thomas Ho
(74) *Attorney, Agent, or Firm* — Harrity & Harrity, LLP

(57) ABSTRACT

A device may update at least one old policy to a new policy, obtain data exchanged between endpoints of an ongoing communication session, apply the new policy to the data and not applying the at least one old policy to the data when a start of the communication session has occurred after the updating, and apply the new policy and the at least one old policy to the data when the start of the communication session has occurred before the updating.

20 Claims, 12 Drawing Sheets

SECURE SESSION HANDLING IN A DEVICE AFTER A POLICY UPDATE

BACKGROUND

When a network device receives a packet, the network device typically applies a security policy to the packet. Applying the security policy entails matching a known set of signatures (e.g., an attack signature) to a portion of the packet, and performing a specific action (e.g., drop the packet) if the portion matches one or more of the signatures.

SUMMARY

According to one aspect, a method may include updating at least one old policy to a new policy, obtaining data exchanged between endpoints of an ongoing communication session, applying the new policy to the data and not applying the at least one old policy to the data when a start of the communication session has occurred after the updating, and applying the new policy and the at least one old policy to the data when the start of the communication session has occurred before the updating.

According to another aspect, a device may include a controller and a service module. The controller may generate new policies, and distribute the new policies to service modules. The service module may receive the new policies from the controller, obtain data in a communication session between two nodes in a network, and apply the new policies and old policies to the data when a start of the communication session has occurred before the new policies are received.

According to yet another aspect, a device may include means for generating new policies, means for updating old policies based on the new policies or deleting the old policies, means for obtaining data from packets in a communication session between two endpoints in a network, means for applying the new policies and the old policies to the data when a start of the communication session has occurred before the old policies are updated, and means for applying the new policies and not the old policies to the data when the start of the communication session has occurred after the old policies are updated.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements. As used herein, the term "policy" may refer to a set of signatures and actions that a device may perform when data matches one or more of the signatures. A signature may include a set of attributes, one of which may be a pattern. The term "packet," as used herein, may refer to a packet, a datagram, or a cell; a fragment of a packet, a datagram or a cell; or other types of data.

Overview

Figure 1A:
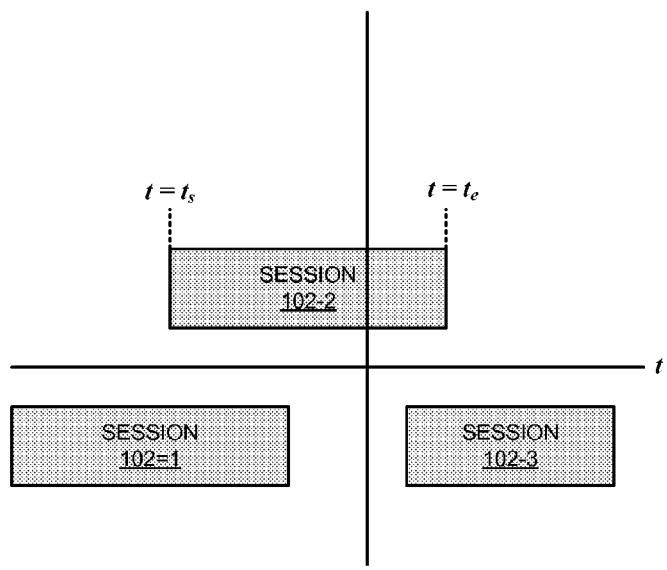
FIG. 1A is a block diagram of exemplary sessions.

As described below, a network device may securely handle sessions after a policy update. FIG. 1A is a block diagram of exemplary sessions 102-1 through 102-3 (herein collectively referred to as sessions 102 and individually as session 102-x) that are administered by a network device (not shown). The term "session," as used herein, may include an interactive communication (e.g., a dialog) between endpoints in a network. The network device may administer session 102-x by applying security policies to packets that are exchanged between the endpoints of session 102-x when the packets pass through the network device.

Figure 1B:
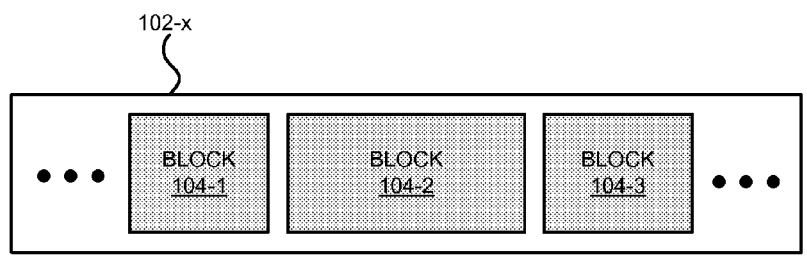
FIG. 1B is a block diagram of an exemplary session of FIG. 1A.

FIG. 1B illustrates session 102-x (e.g., session 102-2). When the network device applies security policies to packets of session 102-x, the network device may use particular portions of the packets. The portions may be conceptually arranged in blocks, of which three are illustrated as blocks 104-1 through 104-3 (herein collectively referred to as blocks 104 and individually as 104-x). Each block 104-x may include a unit of information to which the network device may apply policies, independently of the result of applying the policies to preceding block 104-x.

Figure 1C:
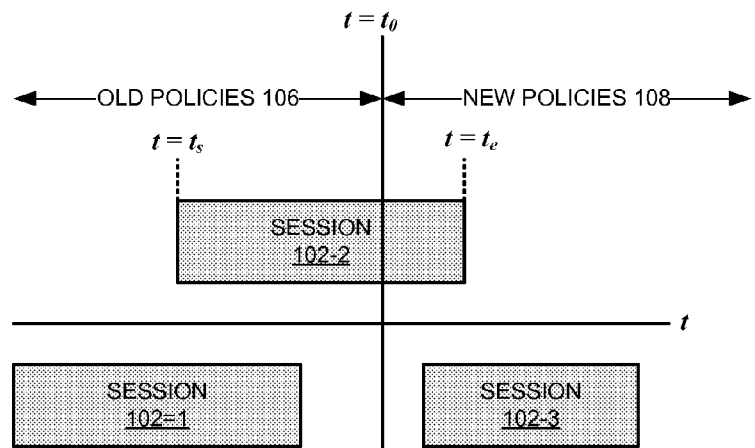
FIG. 1C illustrates updating policies.

FIG. 1C illustrates updating old policies 106 with new policies 108 in the network device at time $t_0$. As shown, the network device may apply old policies 106 to session 102-1, because session 102 begins and terminates before the update. In addition, the network device may apply new policies 108 to session 102-3, as session 102-3 begins after old policies 106 are updated.

For session 102-2, the network device may apply both old policies 106 and new policies 108. The network device may begin to apply new policies 108 to session 102-2, however, when certain conditions are met and not at an arbitrary point in time.

Figure 1D:
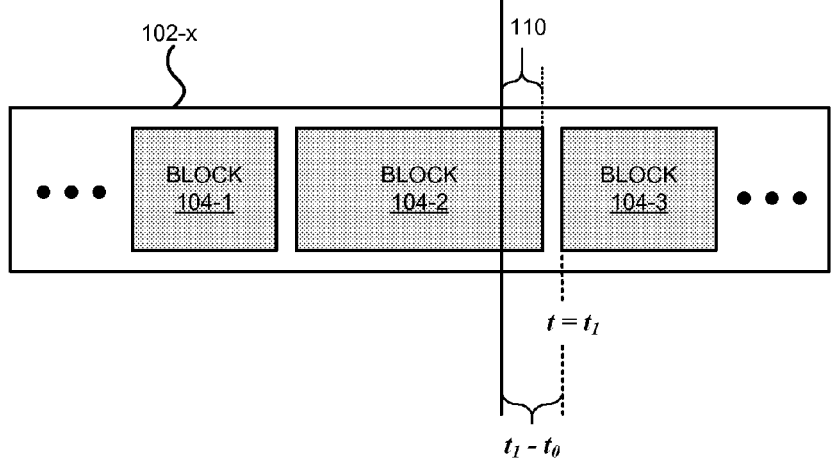
FIG. 1D illustrates applying updated policies.

FIG. 1D illustrates one of the conditions. In FIG. 1D, the network device may begin to apply new policies 108 to block 104-3 at time $t_1$, a first point in time after which a block 104-x may be processed independently of results of applying old policies 106 to preceding blocks 104. In this situation, applying new policies 108 prior to $t_1$ may not provide a useful result. For example, applying new policies 108 at time $t_0$ may result in processing portion 110 of block 104-2. Because each policy is designed to be applied to an entire block, applying new policies 108 to portion 110 may not produce a meaningful result.

Applying both old policies 106 and new policies 108, starting at time $t_1$, may be preferable to switching from old policies 106 to new policies 108 at time $t_0$. If the network device switches from old policies 106 to new policies 108 at time $t_0$, the network device may be unable to complete the application of old policies 106 to block 104-2, and consequently, may fail to detect signatures that should be detected by applying old policies 106 to entire block 104-2 and all subsequent blocks that arrive after 104-2, e.g., 104-3.

Applying both old policies 106 and new policies 108 to session 102-2 may also be preferable to applying only old policies 106 to session 102-2. By failing to apply new policies 108 as soon as possible, the network device may be unable to detect, in packets that are exchanged in session 102-2, new signatures that are specified in new policies 108.

By applying both old policies 106 and new policies 108 to session 102-x, the network device may increase the chance of detecting a potential security threat.

Exemplary Network

Figure 2:
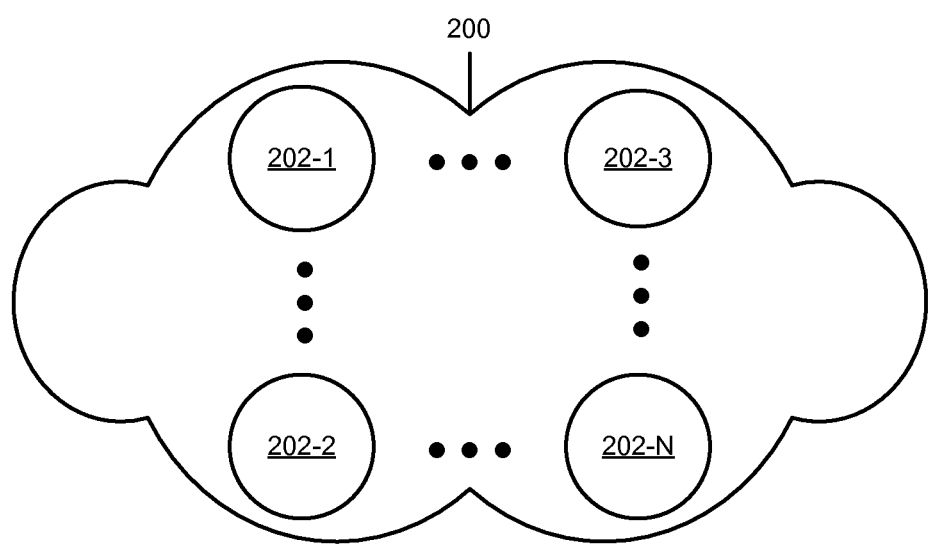
FIG. 2 is a diagram of an exemplary network in which concepts described herein may be implemented.

FIG. 2 illustrates a network 200 in which concepts described herein may be implemented. Network 200 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As shown in FIG. 2, network 200 may include devices 202-1 through 202-N (individually referred to herein as a device 202-x). Device 202-x may include, for example, a router, a switch, a gateway, a server, a work station, a personal computer, etc. Although device 202-x may be implemented as any computer-like or server-like device, in the following description, device 202-x will be described in terms of a router/switch.

Figure 3:
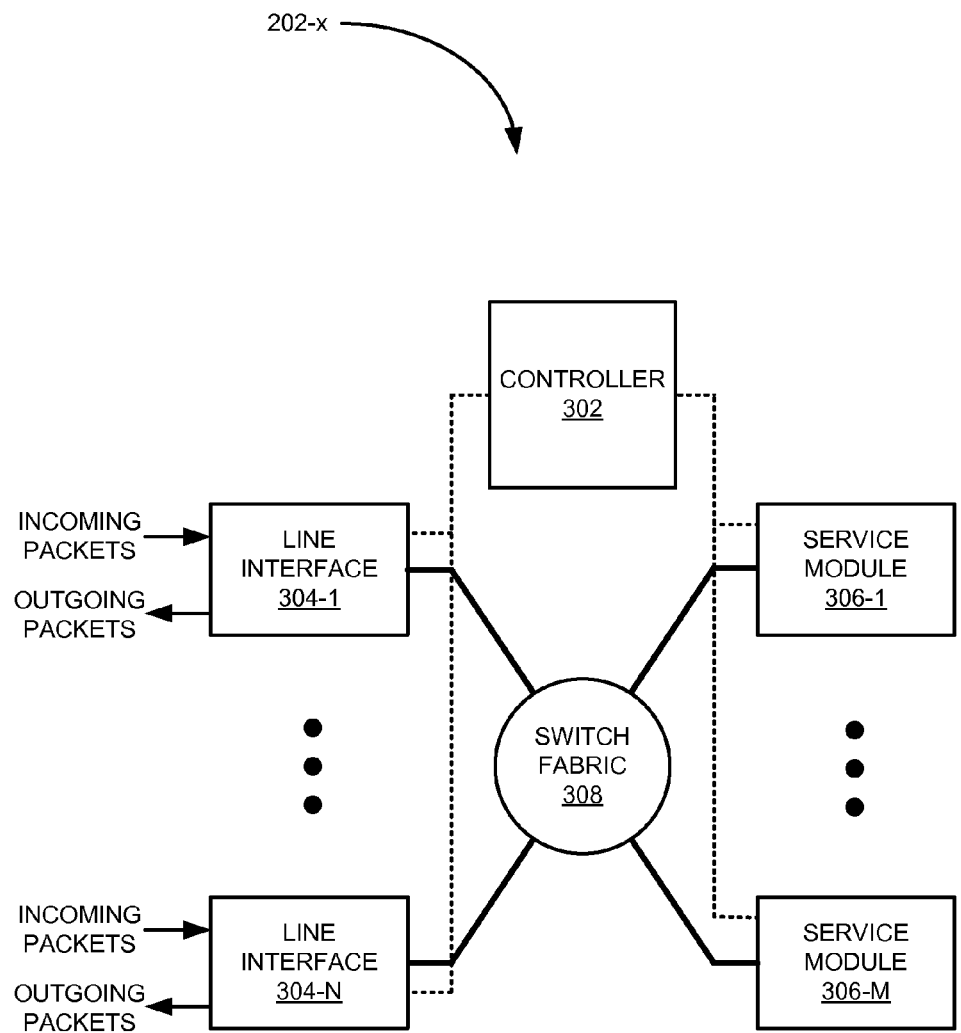
FIG. 3 is a block diagram of an exemplary device of FIG. 2.

FIG. 3 illustrates exemplary components of device 202-x. As shown, device 202-x may include a controller 302, line interfaces 304-1 through 304-N (collectively referred to herein as line interfaces 304 and individually as line interface 304-x), service modules 306-1 through 306-M (collectively referred to herein as service modules 306 and individually as service module 306-x), and a switch fabric 308. Depending on the implementation, device 202-x may include fewer, additional, and/or different components than shown in FIG. 3. For example, device 202-x may include additional or fewer line interfaces or additional controllers, and/or service modules.

Controller 302 may include one or more components for managing routes and/or types of information that may require centralized processing. For example, controller 302 may manage routes (e.g., may accept or disseminate routes to other devices 202) in accordance with routing/signaling protocols, may receive and process statistics related to packets, and/or may process packet samples from other components of device 202-x (e.g., from line interfaces 304).

In another example, controller 302 may convert a set of source patterns into a set of compiled patterns (e.g., patterns that can be efficiently used by another component to perform pattern matching), such as deterministic finite-state automata (DFA), non-deterministic finite-state automata (NFA), etc.

Line interface 304-x may include one or more components for receiving packets from devices in network 200 and for transmitting the packets to other devices in network 200. In addition, line interface 304-x may forward packets, classify packets, redirect packets to other components in device 202-x, manage a table of packet statistics, and/or sample packets.

Service module 306-x may include hardware, software, or a combination of hardware and software for rendering a particular service for a received packet. In processing the packet, service module 306-x may select one or more portions of the packet and perform a pattern match to detect one or more features (e.g., a virus). After processing the packet, service module 306-x may drop the packet or direct the packet to another of service modules 306 or one of line interfaces 304. Examples of service module 306-x may include an anti-virus service module, a firewall service module, an intrusion detection service module, an encryption/decryption service module, and/or other types of service modules.

Switch fabric 308 may include one or more switches for conveying packets from one of line interfaces 304 and/or service modules 306 to another of line interfaces 304 and/or service modules 306.

Figure 4:
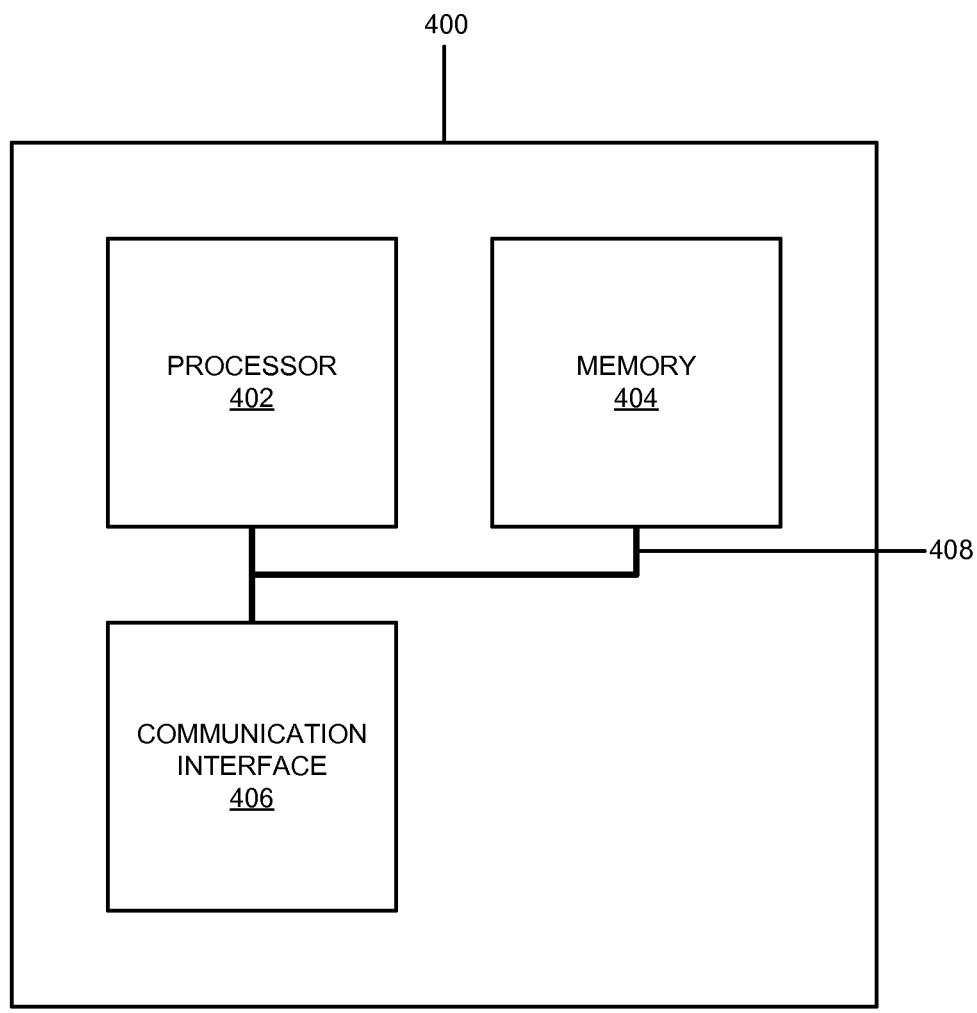
FIG. 4 is a block diagram of an exemplary component of FIG. 3.

FIG. 4 illustrates an exemplary component 400 in device 202-x. Component 400 may represent any one of controller 302, line interfaces 304, and/or service modules 306. As shown, component 400 may include a processor 402, a memory 404, a communication interface 406, and a communication/data path 408. In different implementations, component 400 may include additional, fewer, or different components than the ones illustrated in FIG. 4.

Processor 402 may include a processor, a microprocessor, an Application Specific Integrated Circuit (ASIC), a Field Programmable Gate Array (FPGA), and/or other processing logic capable of controlling component 400. In some implementations, processor 402 may include hardware, such as a co-processor, for matching data to patterns.

Memory 404 may include content addressable memory (CAM), static memory, such as read only memory (ROM), and/or dynamic memory, such as random access memory (RAM) or onboard cache, for storing data (e.g., patterns) and machine-readable instructions. Memory 404 may also include storage devices, such as a hard disc, and/or flash memory, as well as other types of storage devices. Depending on the implementation, portions of memory 404 may be directly addressable via processor 402 or components in processor 402 (e.g., a co-processor for matching patterns to data).

Communication interface 406 may include any transceiver-like mechanism that enables component 400 to communicate with other devices and/or systems. Communication/data path 408 may provide an interface through which components of component 400 and/or device 202-x can communicate with one another.

Figure 5:
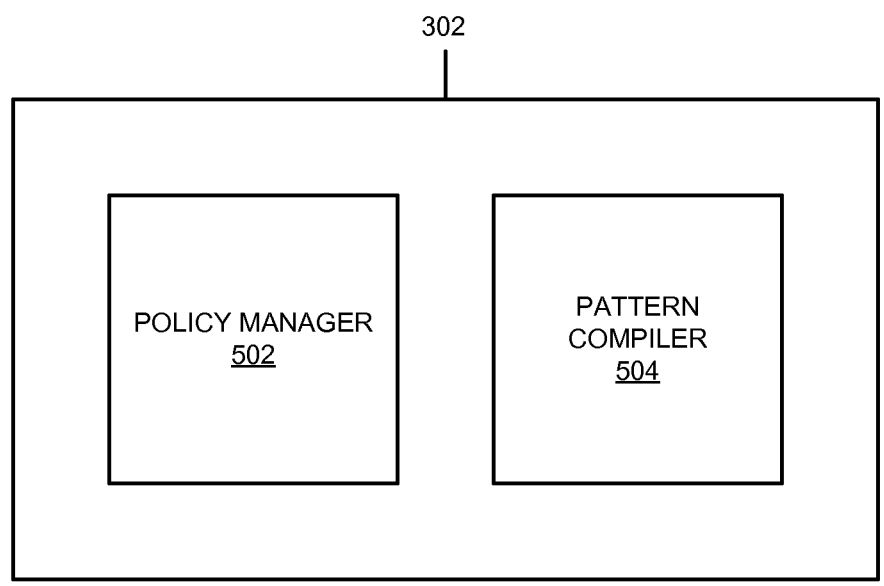
FIG. 5 is a functional block diagram of an exemplary controller of FIG. 3.

FIG. 5 is a functional block diagram of controller 302. As shown, controller 302 may include a a policy manager 502 and a pattern compiler 504. Depending on the implementation, controller 302 may include additional, fewer, or different components than controller illustrated in FIG. 5. For example, controller 302 may include an operating system (e.g., Juniper Operating System (JUNOS™), Linux, etc.), a routing engine, an application (e.g., an email application), etc.

Policy manager 502 may include one or more components (e.g., hardware or software component) for managing policies. As used herein, the term "policy" may refer to a set of signatures and actions that are associated with the set of signatures. When data (e.g., part of a packet) matches one or more of the signatures, device 202-x may perform the actions.

Policy manager 502 may interact with a user or another device in network 200 to transfer, create, edit, and/or remove policies. In some implementations, policy manager 502 may invoke another component (e.g., pattern compiler 504), and/or distribute information (e.g., distribute compiled patterns) to other components (e.g., service modules 306) in device 202-*x*.

Pattern compiler 504 may include one or more components for converting (e.g., compiling) a set of patterns one format to that in another format. In one implementation, pattern compiler 504 may convert patterns in signatures of a policy into a compiled pattern database (a pattern et). In some implementations, the compiled pattern may be encrypted or formatted in a specific manner. The compiled pattern database may be loaded into a pattern matching engine (PME), for the PME to match data to patterns in the pattern database.

Figure 6A:
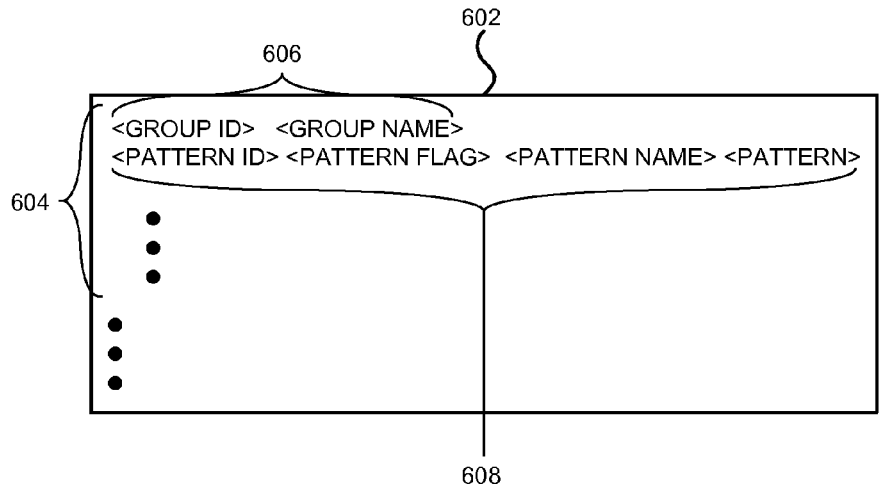
FIG. 6A shows an exemplary pattern file.

In one implementation, pattern compiler 504 may accept one or more pattern files as input. FIG. 6A shows an exemplary pattern file 602. As shown, pattern file 602 may include one or more groups of patterns, one of which is illustrated as group 604. As further shown, group 604 may include group header 606 and one or more pattern fields 608. Depending in implementation, pattern file 602 may include additional, fewer, or different headers, fields, and/or types of information that pertain to patterns.

Group header 606 may include information for identifying a group of patterns, such as a group name, a group identifier, etc. Pattern field 608 may include information such as an identifier for identifying a pattern, flags for indicating how pattern field 608 is to be compiled (e.g., whether the compiled pattern is to be encrypted), a name of the pattern, and a pattern. The pattern may include a sequence of symbols or an expression (e.g., a regular expression).

Given pattern file 602, pattern compiler 504 may convert (e.g., compile) each of patterns in one format to a database of patterns. For example, in one implementation, pattern compiler 504 may convert a pattern that is described by a series of symbols to a deterministic finite-state automaton (DFA). In other implementations, pattern compiler 504 may convert a pattern into other types of information, such as a non-deterministic finite-state automaton (NFA).

Figure 6B:
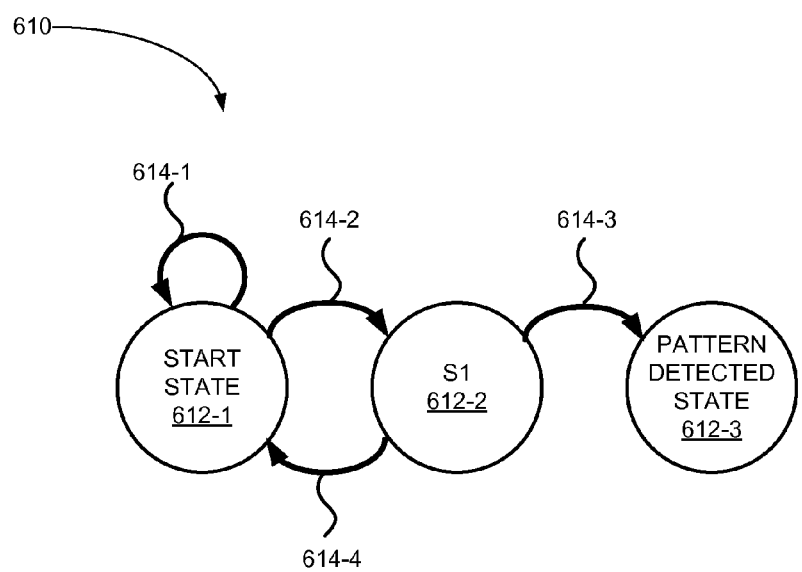
FIG. 6B illustrates an exemplary deterministic finite-state automaton (DFA) that corresponds to a compiled pattern.

FIG. 6B illustrates an exemplary DFA 610 that corresponds to a pattern of symbols "ab." Although FIG. 6B shows DFA 610 in a graphical form, output of pattern compiler 504 may describe DFA 610 in other ways. For example, pattern compiler 504 may output a description of DFA 610 as a series of symbols.

As shown in FIG. 6B, DFA 610 may include a start state 612-1, a state 612-2, and a pattern detected state 612-3. Depending on the implementation, DFA 610 may include fewer, additional, or different states.

Given DFA 610, a pattern matching engine may use DFA 610 to detect the pattern "ab" in data. Using DFA 610 to detect the pattern "ab" will be described below in greater detail, with reference to a pattern matching engine.

Figure 7:
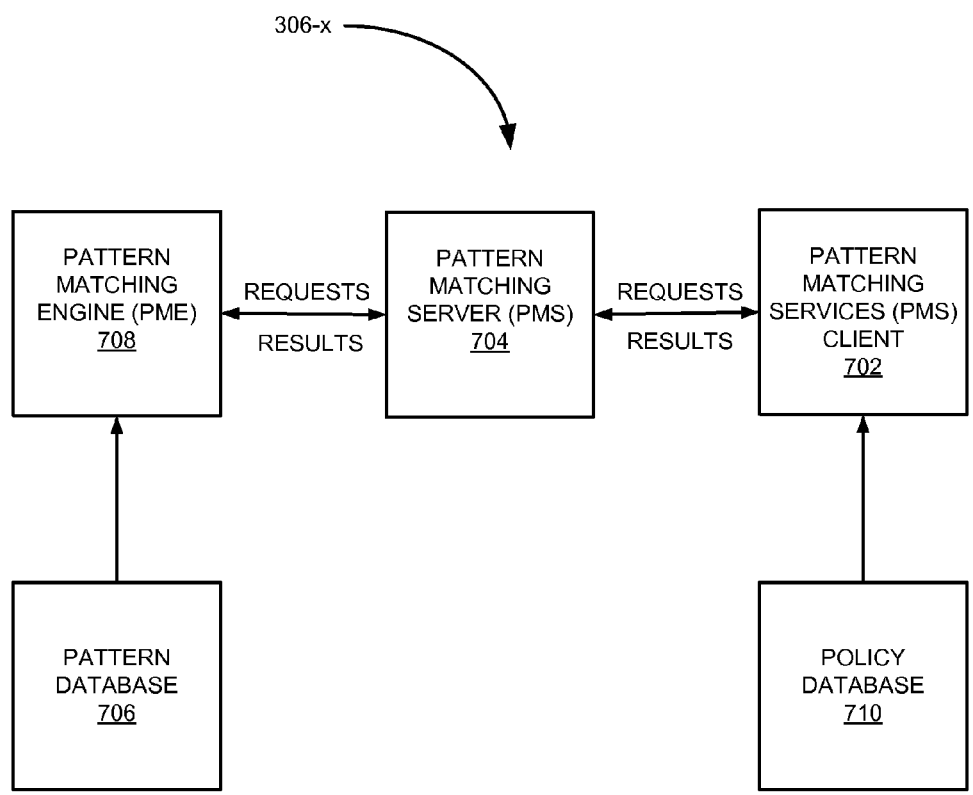
FIG. 7 is a functional block diagram of an exemplary service module of FIG. 3.

FIG. 7 is a functional block diagram of service module 306-*x*. As shown, service module 306-*x* may include a pattern matching services (PMS) client 702, a pattern matching server (PMS) 704, a pattern database 706, a pattern matching engine (PME) 708, and/or a policy database 710. Depending on the implementation, service module 306-*x* may include additional, fewer, or different components than those illustrated in FIG. 7 (e.g., a specialized software module for an intrusion detection system (IDS)).

PMS client 702 may include hardware and/or software components that are associated with sending pattern match requests to PMS 704, receiving a result of matching patterns from PMS 704, and processing the result. In one implementation, PMS client 702 may perform these functions by providing support for procedures (e.g., threads, programs, subroutines, methods, scripts, etc.) that may be invoked via a set of pattern match application programming interfaces (APIs).

PMS 704 may include one or more components for queuing pattern match requests from PMS clients 702, relaying the pattern match requests to PME 708, receiving responses to the pattern match requests from PME 708, and distributing the responses to one or more PMS clients 702.

Pattern database 706 may include one or more sets of compiled patterns (e.g., DFA 610). Presence of one of the compiled patterns in data may indicate that the data poses a security threat to device 202-*x* and/or network 200. For example, assume that pattern database 706 includes a DFA that represents the pattern "10111000101111110000." Presence of that particular pattern in data (e.g., data string "111101011100010111111100000") may indicate that the data carries a computer virus.

PME 708 may include one or more components for receiving pattern match requests that are relayed by PMS 704 from PMS client 702, matching data to a set of patterns, and providing results of matching the data to the pattern. PME 708 may forward the results to PMS 704, which may relay the results to PMS client 702.

In matching data to patterns, PME 708 may use DFAs that are provided in pattern database 708. For example, assume that data includes "xyzwabm" and pattern database 708 includes DFA 610 that is illustrated in FIG. 6B. Furthermore, assume that PME 708 can enter any of states 612-1 through 612-3 (e.g., PME 708 may enter a state by setting specific values to internal variables).

In accordance with DFA 610, PME 708 may begin to match data "xyzwabm" to pattern "ab" in start state 612-1. Each time PME 708 scans one of first four symbols "xyzw" in data "xyzwabm," PME 708 may stay in state 612-1, as indicated by state transition arc 614-1. When PME 708 scans letter "a" in "xyzwabm," however, PME 708 may transition to state Si 612-2, as indicated by state transition arc 614-2. In state S1 612-2, when PME 708 scans letter "b" in "xyzwabm," PME 708 may transition to pattern detected state 612-3 via state transition arc 614-4. If PME 708 does not scan letter "b" in state S1 612-2, PME 708 may follow state transition are 614-3 and return to state 612-1

Figure 8:
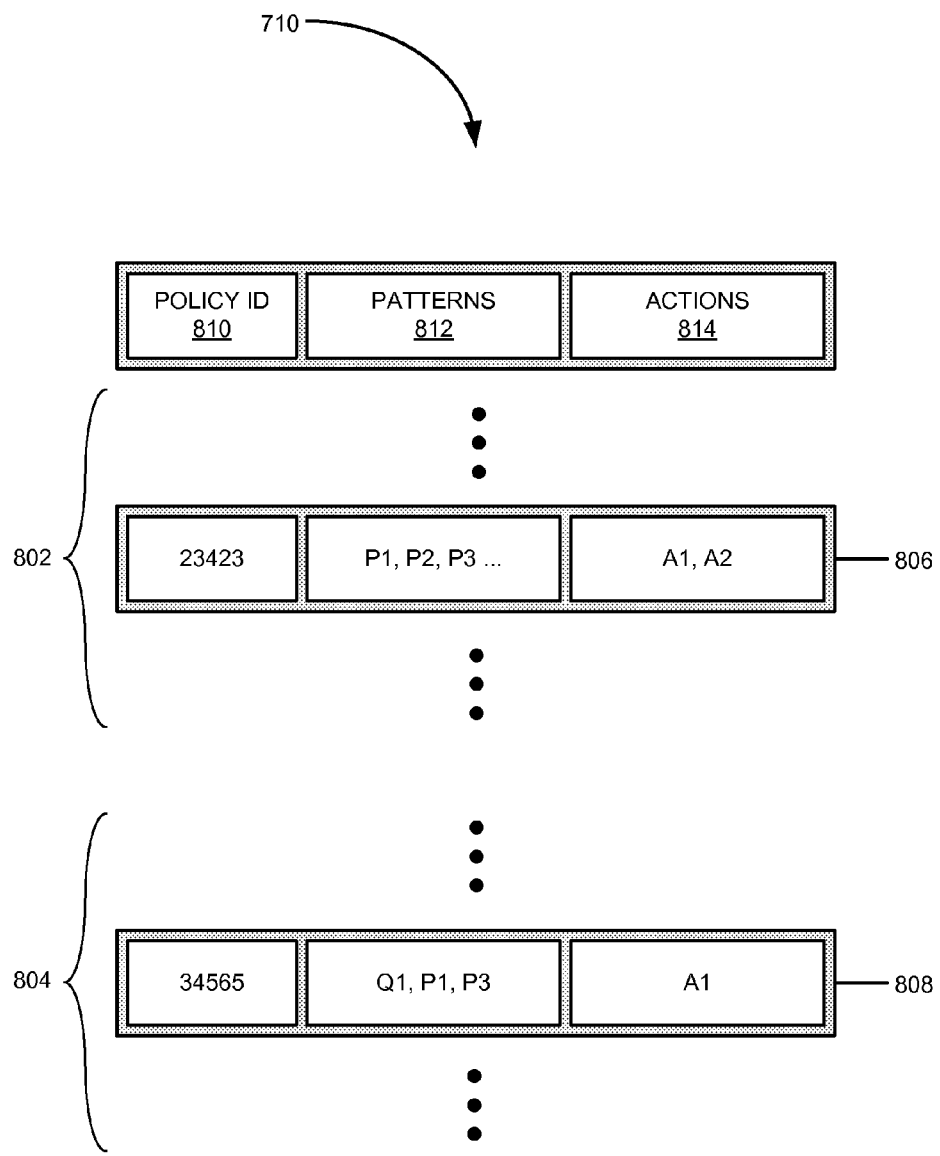
FIG. 8 is a block diagram of an exemplary policy database of FIG. 7.

Returning to FIG. 7, policy database 710 may include one or more policies. FIG. 8 shows an exemplary policy database 710. As shown, policy database 710 may include old policies 802 and new policies 804 (e.g., policies after a policy update). In FIG. 8, old policies 802 and new policies 804 are depicted as including old policy 806 and new policy 808.

As further shown, each of policies (e.g., old policies 802 and new policies 804) may include a policy identifier (ID) field 810, a patterns field 812, and an actions field 814. Depending on the implementation, each policy in policy database 710 may include fewer, additional, or different fields than those illustrated in FIG. 8.

Policy ID field 810 may include a value that identifies the policy. Patterns field 812 may include a list of patterns to which PME 708 may match data before device 202-*x* can perform a set of actions that are associated with the policy. Actions field 814 may identify a list of actions that device 202-*x* may perform when data matches patterns that are listed in patterns field 812.

For example, assuming old policy 806 is in effect, if a string data (e.g., a portion of a packet) matches patterns P1, P2, or P3, device 202-*x* may perform actions A1 (e.g., drop the packet that contains P1) and A3 (e.g., sample the packet). In another example, assuming new policy 808 is in effect, if data matches patterns Q1, P1, or P3, device 202-*x* may perform action A1.

Exemplary Process for Handling Sessions after a Policy Update

Figure 9:
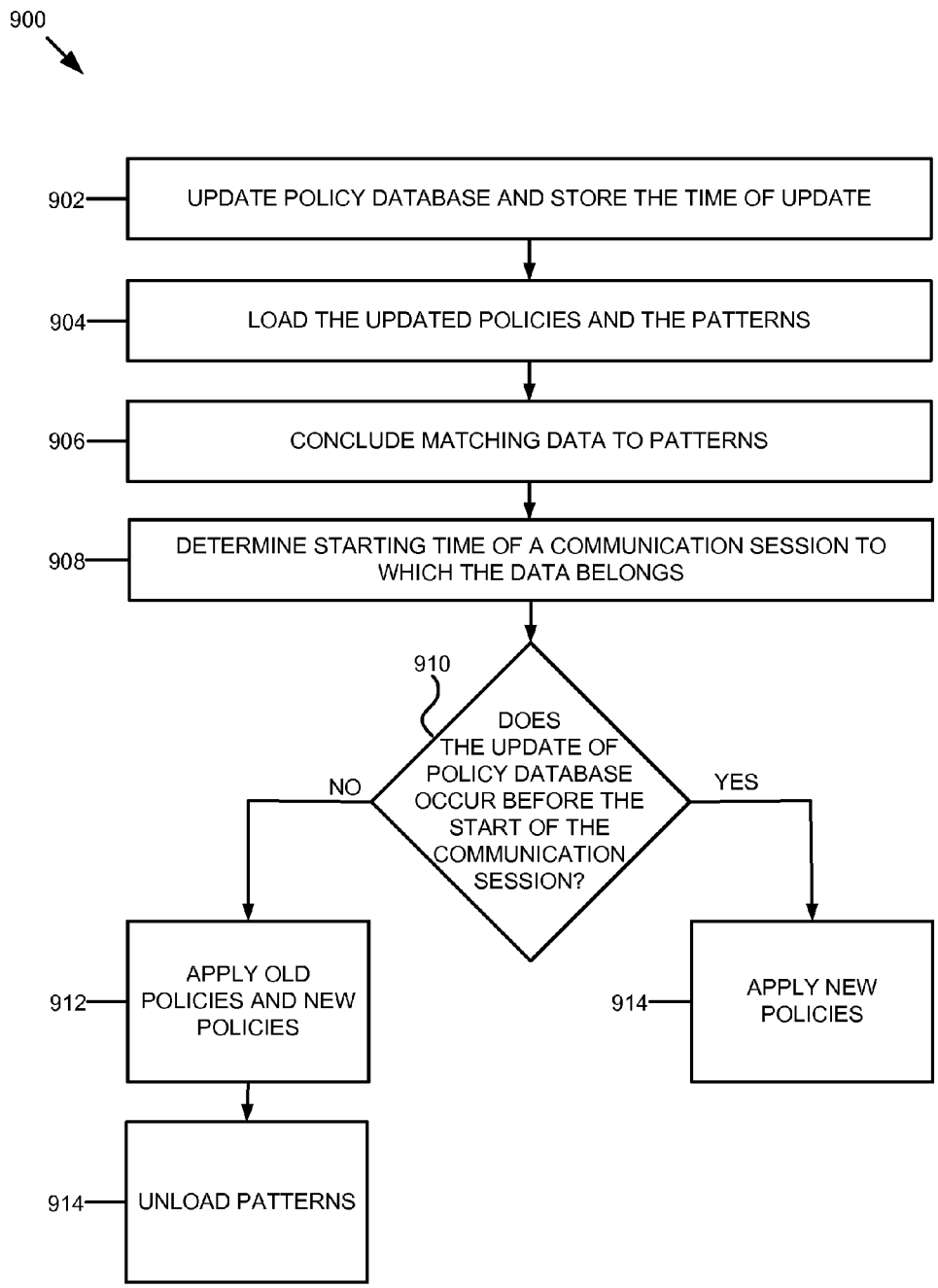
FIG. 9 is flow diagram of an exemplary process for handling sessions after a policy update.

FIG. 9 illustrates a flow diagram of an exemplary process 900 for handling sessions after a policy update. In network 200, device 202-x may examine one or more portions of packets (e.g., header, payload, etc.) of communication sessions to ensure that the packets do not compromise network security. After device 202-x updates security policies that are associated with examining the packets, device 202-x may perform process 900 to securely handle the communication sessions.

Assume that, device 202-x is examining packets of one or more communication sessions in network 200.

Process 900 may begin at block 902, where policy database 710 may be updated and the time of policy update may be stored (block 902). In one implementation, policy manager 502 may modify or create one or more new policies, compile new patterns that may be associated with the new policies, and distribute the new policies and/or patterns to one or more service modules 306. When service module 306-x receives new policies/patterns, service module 306-x may update pattern database 706 and policy database 710. In addition, service module 306-x may store the time when service module 306-x updates the patterns/policies.

The updated patterns and policies may be loaded (block 904). PMS client 702 and/or PME 708 may load the updated patterns and/or policies into a dynamic memory that may be accessible PME 708. With the updated patterns in the dynamic memory, PME 708 may match data (e.g., a portion of a packet) to the updated patterns.

Matching data to the patterns may be concluded (block 906). When the policy database is updated, PMS client 702 may have been matching, via PMS 704 and PME 708, data that match patterns in pattern database 706. PMS client 702 may conclude matching the data to the patterns.

Figure 10:
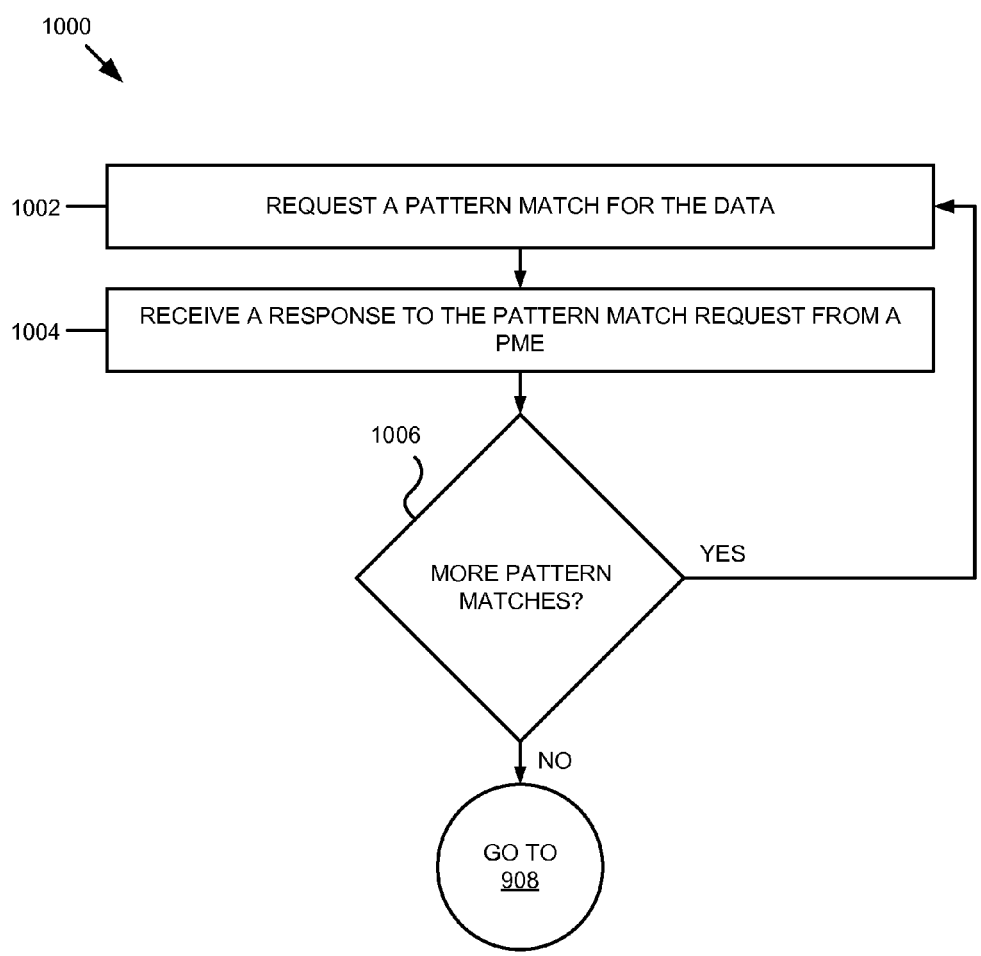
FIG. 10 is a flow diagram of an exemplary process for matching data to patterns.

FIG. 10 illustrates a process 1000 for matching data to the patterns. As shown, process 1000 may begin at 1002, where PME client 702 may send a request to match a portion or all of the data to PME 708 via PMS 704 (block 1002). At block 1004, PME client 702 may receive a response, via PMS 704, from PME 708 (block 1002). The response may include a list of zero or more patterns that match the portion of the data. At block 1006, PMS client 702 may determine if PMS client 702 needs to issue additional requests to PME 708 (block 1006). If so, process 1000 may return to 1002. Otherwise, process 1000 may conclude matching patterns.

Returning to FIG. 9, starting time of a communication session to which the data belongs may be determined (block 908). For example, assume that, to apply a policy, PMS client 702 obtains data from a packet that belongs to a communication session. In such an instance, PMS client 702 may determine the starting time of the communication session.

At block 910, a determination may be made as to whether the policy update has occurred before the start of the communication session (block 910). In one implementation, PMS client 702 may compare the time of policy update to the starting time of the communication session. If the policy update has occurred after the start of communication session, process 900 may proceed to block 912.

At block 912, old policies and new policies may be applied (block 912). For example, PMS client 702 may search old policies 802 and new policies 804 in policy database 710 for a list of policies whose patterns field 812 includes the list of patterns that match the data (see block 906). For each policy whose patterns field 812 includes the list of patterns, PMS client 702 may perform actions that are listed in actions field 814.

In the above, if more than one policy whose patterns field 812 includes the list of patterns is found, and if actions that are specified in different policies are inconsistent, PMS client 702 may perform the action that may be considered more extreme or restrictive than other actions. For example, an action under one policy may specify device 202-x to terminate a communication session, and another action may specify device 202-x to log data that is exchanged during the communication session. In such an instance, device 202-x may terminate the communication session.

Returning to block 910, if the policy update has occurred before the start of communication session, process 900 may proceed to block 914, where the new policies may be applied (block 914). For example, PMS client 702 may search new policies 804 for a list of policies whose patterns field 812 includes the list of patterns that match the data (see block 906). For each policy whose patterns field 812 includes the list of patterns, PMS client 702 may perform actions that are listed in actions field 814.

Patterns may be unloaded or deleted (block 916). Eventually, all communication sessions that began before the policy update and packet processing associated with the communication session may be terminated. In such an instance, patterns that are associated with the old policies and not with the new policies may be unloaded from the dynamic memory, as the patterns may no longer be used. In addition, the old policies may be unloaded or deleted from the dynamic memory.

In the above, blocks 906 through 914 can be understood within context of a timeline that spans lifetime of a communication session. Assume that old policies are updated at $t=t_0$ as depicted in FIG. 1C and FIG. 1D. In addition, assume that PMS client 702 is receiving data and enforcing old policies just before the old policies are updated.

From the perspective of PMS client 702, at this point, PMS client 702 may continue to match patterns until the pattern matching for the data is completed. In FIG. 1D, this is illustrated as matching portion 110 to patterns, and in FIG. 9, as block 906.

Once PMS client 702 concludes matching patterns for portion 110, PMS client 702 may determine whether the session to which portion 110 belongs has started after the policy update (e.g., session 102-3) or before the policy update (e.g., session 102-2). PMS client 702 may determine this by comparing the starting time of the communication session to which the data belongs to the time of policy update (see blocks 908 and 910). If the communication session has started after the policy update, PMS client 702 may apply new policies (block 914). Otherwise, PMS client 702 may apply both new and old policies (block 912).

In the above, after the policies are updated, PMS client 702 may complete the application of the old policies to portion 110 before PMS client 702 applies both the new and old policies. Thus, there is a gap in time between the time of policy update and the time when the new policies are applied. In FIG. 1D, the gap may be determined as $t_1-t_0$.

Figure 11:
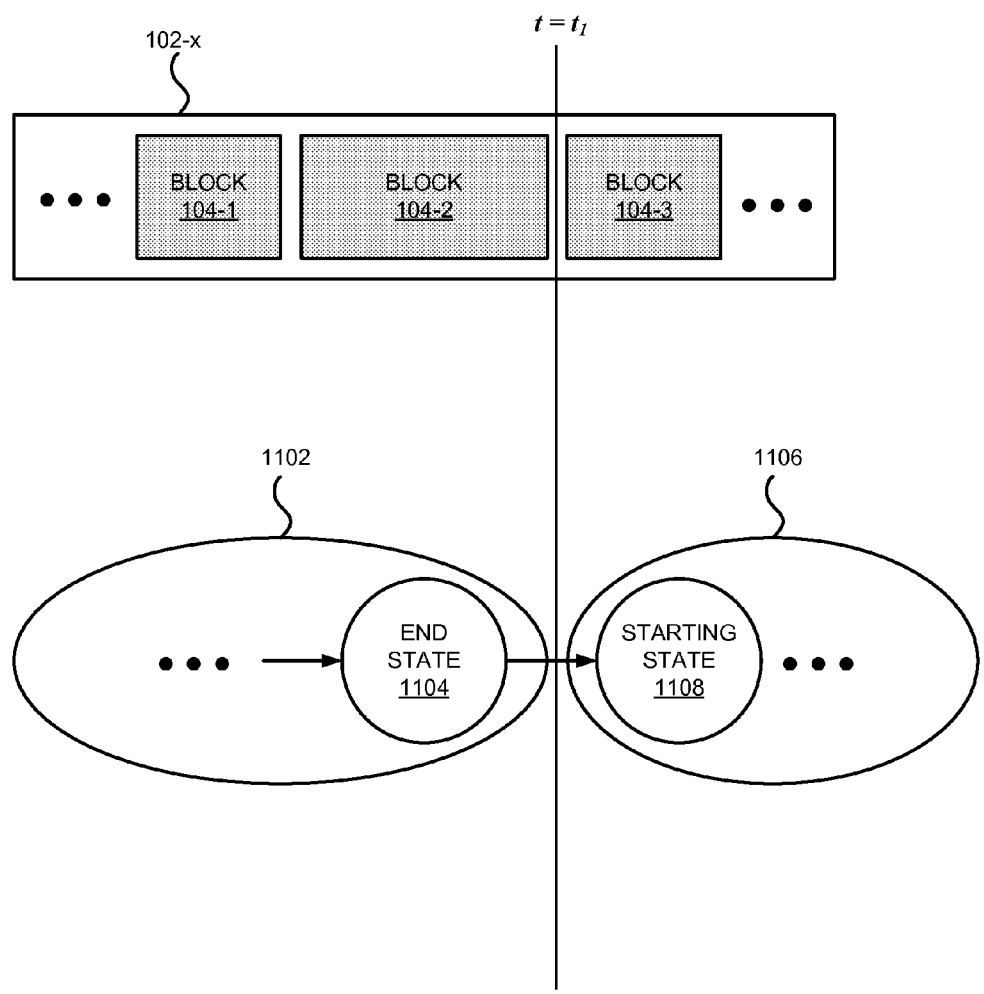
FIG. 11 is a diagram illustrating processing consistent with the process of FIG. 9.

If pattern database 706 includes DFAs as compiled patterns, for PME 708, completing the application of the old policies for portion 110 may be equivalent to arriving at an end state of a DFA. This is illustrated in FIG. 11, which depicts session 102-x and a DFA 1102 that corresponds to a pattern in pattern database 706. Assume that the old policies have been updated before $t=t_1$. For PME 708, completing pattern matches for block 104-2 may be equivalent to traversing states in DFA 1102 until PME 708 arrives at an end state 1104, where a pattern match is terminated (e.g., a matching pattern is found or not found). At a state within a DFA 1106 (e.g., starting state 1108), PMS client 702 may begin to apply both the old policies and new policies.

In the above, applying both the old policies and the new policies may be preferable to immediately switching from old policies to new policies at the time of update. If device 202-*x* switches from the old policies to the new policies without completing interrelated pattern matches (e.g., pattern matches for portion 110), device 202-*x* may be unable to detect patterns that should be detected by applying old policies 106 to entire block 104-2.

Applying both the old policies and the new policies 108 to session may also be preferable to applying only the old policies, which may be out-of-date at the time when the old policies are updated.

By applying both the old policies and the new policies 108, device 202-*x* may increase the security of network 200 and device 202-*x*.

Conclusion

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 9 and 10, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
    updating, by a device, at least one old policy to a new policy;
    obtaining, by the device, a plurality of data packets transmitted between endpoints of an ongoing communication session;
    determining, by the device, whether the updating occurs during a first communication session, of the ongoing communication session, the first communication session including a plurality of data packets and a transmission a first block of data packets, of the plurality of data packets, between the endpoints before the updating;
    determining, by the device and based on determining that the updating occurs during the first communication session, whether the updating occurs after beginning the transmission of the first block of data packets and before ending the transmission of the first block of data packets;
    applying, by the device and based on determining that the updating occurs after beginning the transmission of the first block of data packets and before ending the transmission of the first block of data packets, the at least one old policy to the entire first block of data packets without applying the new policy;
    applying, by the device and based on determining that the updating occurs after beginning the transmission of the first block of data packets and before ending the transmission of the first block of data packets, the new policy and the at least one old policy to a second block of data packets, of the plurality of data packets, the at least one old policy being applied to the entire second block of data packets and the new policy being applied to the entire second block of data packets; and
    applying, by the device, the new policy and not the at least one old policy to a third block of data packets, of a plurality of data packets, included in a second communication session, of the ongoing communication session, the second communication session including a transmission of the third block of data packets between the endpoints after the updating, the second communication session being different than the first communication session and the second communication session beginning after the first communication session ends.

2. The method of claim 1, where applying the new policy and the at least one old policy includes:
    completing pattern matches and applying old policies before applying both the new policy and the at least one old policy.

3. The method of claim 2, where completing pattern matches includes:
    performing an action in accordance with an old policy at an end state of a deterministic finite-state automaton and not applying the new policy;
    transitioning to another deterministic finite-state automaton; and
    applying both the new policy and the at least one old policy after transitioning to the other deterministic finite-state automaton.

4. The method of claim 1, where updating the at least one old policy includes:
    inserting the new policy in a policy database.

5. The method of claim 1, further comprising:
    storing the new policy in a dynamic memory.

6. The method of claim 1, where applying the new policy and not applying the at least one old policy includes:
    identifying a policy, within a policy database, that includes a pattern that matches information included in at least one of the plurality of data packets; and
    performing an action that is associated with the identified policy.

7. The method of claim 1, where applying the new policy and the at least one old policy includes:
    finding a first policy, among the at least one old policy, that includes a pattern that matches information included in at least one of the plurality of data packets;

finding a second policy, among a plurality of new policies, that includes a pattern that matches information included in at least one of the plurality of data packets; and performing an action that is associated with either the first policy or the second policy.

8. The method of claim 1, further comprising:
comparing a starting time of the first communication session and the second communication session to a time when the at least one old policy is updated.

9. The method of claim 1, where applying the new policy and not applying the at least one old policy includes:
sending a request from a client to a pattern matching engine for a list of patterns that match information included in at least one of the plurality of data packets.

10. The method of claim 1, further comprising:
matching information included in at least one of the plurality of data packets to patterns in a pattern database.

11. The method of claim 10, where matching information included in at least one of the plurality of data packets includes:
traversing states of a deterministic finite-state automaton.

12. The method of claim 1, further comprising:
deleting the at least one old policy from a dynamic memory.

13. The method of claim 1, further comprising:
creating the new policy.

14. The method of claim 1, further comprising:
compiling patterns into deterministic finite-state automata or a non-deterministic finite-state automata; and
performing pattern matching of information included in at least one of the plurality of data packets based on the compiled patterns.

15. The method of claim 14, where compiling patterns into deterministic finite-state automata includes:
encrypting the compiled patterns.

16. The method of claim 1, where applying the new policy and the at least one old policy includes:
performing pattern matches for an intrusion detection system; or
performing pattern matches for an anti-virus system.

17. A device comprising:
a controller, at least partially implemented in hardware, to:
update old policies to new policies, and
distribute the new policies; and
a service module, at least partially implemented in hardware, to:
receive the new policies from the controller;
obtain a first data packet in a first part of a first communication session transmitted between two nodes in a network;
determine whether the updating occurs during the first communication session, the first communication session including a plurality of data packets and a transmission of a first block of data packets, of the plurality of data packets, between the two nodes before the updating;
determine, based on determining that the updating occurs during the first communication session, whether the updating occurs after beginning the transmission of the first block of data packets and before ending the transmission of the first block of data packets;
apply, based on determining that the updating occurs after beginning the transmission of the first block of data packets and before ending the transmission of the first block of data packets, the old policies to the entire first block of data packets without applying the new policies;
obtain a second block of data packets in a second part of the first communication session;
apply, based on determining that the updating occurs after beginning the transmission of the first block of data packets and before ending the transmission of the first block of data packets, the new policies and old policies to the second block of data packets, the old policies being applied to the entire second block of data packets and the new policies being applied to the entire second block of data packets;
obtain a third block of data packets in a second communication session between the two nodes, the second communication session being different than the first communication session and the second communication session beginning after the first communication session ends; and
apply the new policies and not the old policies to the third block of data packets when a start of the second communication session begins after the new policies are received.

18. The device of claim 17, where the device comprise at least one of:
a router;
a switch;
a server;
a firewall;
a personal computer; or
a gateway.

19. The device of claim 17, where the service module includes at least one of:
an Intrusion Detection system (IDS) module; or
an anti-virus module.

20. A device comprising:
a memory to store instructions; and
a processor to execute the instructions to:
generate new policies;
update old policies based on the new policies;
obtain a first data packet in a first part of a first communication session, the first data packet being transmitted between two endpoints in a network;
determine whether the updating occurs during the first communication session, the first communication session including a plurality of data packets and a transmission of a first block of data packets, of the plurality of data packets, between the two endpoints before the updating;
determine, based on determining that the updating occurs during the first communication session, whether the updating occurs after beginning the transmission of the first block of data packets and before ending the transmission of the first block of data packets;
apply, based on determining that the updating occurs after beginning the transmission of the first block of data packets and before ending the transmission of the first block of data packets, the old policies to the entire first block of data packets without applying the new policies;
obtain a second block of data packets in a second part of the first communication session;
apply, based on determining that the updating occurs after beginning the transmission of the first block of data packets and before ending the transmission of the first block of data packets, the new policies and the old policies to a second block of data packets, the old policies being applied to the entire second block of data packets and the new policies being applied to the entire second block of data packets;

obtain a third block of data packets in a second communication session between the two endpoints, the second communication session being different than the first communication session and the second communication session beginning after the first communication session ends; and apply the new policies and not the old policies to a third block of data packets when a start of the second communication session begins after the old policies are updated.

* * * * *

UNITED STATES PATENT AND TRADEMARK OFFICE
CERTIFICATE OF CORRECTION

PATENT NO. : 8,490,149 B1
APPLICATION NO. : 12/194704
DATED : July 16, 2013
INVENTOR(S) : Sunil Ravi et al.

Page 1 of 1

It is certified that error appears in the above-identified patent and that said Letters Patent is hereby corrected as shown below:

In the Claims

Column 10, claim 1, line 1 should read: "including a plurality of data packets and a transmission of"

Signed and Sealed this
First Day of October, 2013

Teresa Stanek Rea
*Deputy Director of the United States Patent and Trademark Office*